US010250695B2

United States Patent
Khan et al.

(10) Patent No.: US 10,250,695 B2
(45) Date of Patent: Apr. 2, 2019

(54) MITIGATION OF PROCESSING LOOPS IN A COMMUNICATION NETWORK

(71) Applicant: Comcast Cable Communications, LLC, Philadelphia, PA (US)

(72) Inventors: Sohel Khan, Philadelphia, PA (US); Jon A. Boone, Coatesville, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 824 days.

(21) Appl. No.: 14/046,208

(22) Filed: Oct. 4, 2013

(65) Prior Publication Data

US 2014/0280992 A1 Sep. 18, 2014

Related U.S. Application Data

(60) Provisional application No. 61/784,217, filed on Mar. 14, 2013.

(51) Int. Cl.
| | |
|---|---|
| *H04L 29/08* | (2006.01) |
| *H04L 29/14* | (2006.01) |
| *G06F 15/16* | (2006.01) |
| *H04L 29/06* | (2006.01) |

(52) U.S. Cl.
CPC ............ *H04L 67/143* (2013.01); *H04L 69/40* (2013.01); *H04L 29/06* (2013.01)

(58) Field of Classification Search
CPC ....... H04L 67/143; H04L 69/40; H04L 45/18; H04L 29/06; H04L 45/00
USPC .......................... 709/228; 370/255, 228, 392
See application file for complete search history.

(56) References Cited

U.S. PATENT DOCUMENTS

| | | | | |
|---|---|---|---|---|
| 5,077,730 | A * | 12/1991 | Arrowood | H04L 29/06 370/228 |
| 6,411,946 | B1 * | 6/2002 | Chaudhuri | G06Q 20/102 705/40 |
| 7,995,504 | B2 * | 8/2011 | Ransom | H04L 41/12 370/272 |
| 2005/0198270 | A1 * | 9/2005 | Rusche | H04L 51/12 709/224 |
| 2007/0268904 | A1 * | 11/2007 | van Bemmel | H04L 45/00 370/392 |
| 2009/0052434 | A1 * | 2/2009 | Jackson | H04L 12/66 370/352 |
| 2010/0085898 | A1 * | 4/2010 | Giaretta | H04L 45/18 370/255 |
| 2010/0153804 | A1 * | 6/2010 | Cai | H04L 47/283 714/748 |
| 2011/0154208 | A1 * | 6/2011 | Horii | H04L 67/22 715/736 |

* cited by examiner

*Primary Examiner* — Emmanuel L Moise
*Assistant Examiner* — Zi Ye
(74) *Attorney, Agent, or Firm* — Ballard Spahr LLP

(57) ABSTRACT

Aspects of the disclosure relate to error prevention in a communication session traffic environment. One or more embodiments of the disclosure relate to mitigation of processing loops during establishment of a communication session in a network. A network node at the boundary of the network can mitigate processing loops by monitoring formation of such loops and proactively terminating communication processing in response to expiration of a timer. The timer can be initiated in response to formation of a loop.

20 Claims, 10 Drawing Sheets

MITIGATION OF PROCESSING LOOPS IN A COMMUNICATION NETWORK

CROSS REFERENCE TO RELATED PATENT APPLICATION

This application claims priority to U.S. Provisional Application No. 61/784,217 filed Mar. 14, 2013, herein incorporated by reference in its entirety.

BACKGROUND

Establishment of a communication session (e.g., an interactive multimedia session) generally entails allocation of network resources (e.g., bandwidth, communication channels (such as signaling channels), packet data protocols (PDPs), processing resources, and the like), regardless of the communication session being established successfully or failing to initiate. In scenarios in which the communication session is attempted between a peer network and a service network, processing such communication session can form routing loops which generate one or more network responses, such as alarms, unnecessarily consuming network resources associated with management of such responses. These and other shortcomings are addressed by the present disclosure.

SUMMARY

It is to be understood that both the following general description and the following detailed description are exemplary and explanatory only and are not restrictive, as claimed. One or more embodiments of the disclosure relate to mitigation of processing loops during establishment of a communication session in a network. In one aspect, a network node at a boundary of the network can mitigate processing loops by monitoring formation of such loops and proactively terminating communication processing in response to expiration of a timer. The timer can be initiated in response to formation of a processing loop (also referred to as a routing loop). An expiration period, or threshold (also referred to herein as a timer setting), for the timer can be configured based on one or more factors associated with the communication session. In one aspect, the expiration period can be configured according to a schedule or in response to a network event (e.g., addition of bandwidth). Configuration of the timer can be automatic or can be autonomous. In an aspect, the methods and systems provided can reduce network processing associated with management of network responses (e.g., alarms) to formation of a routing loop.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
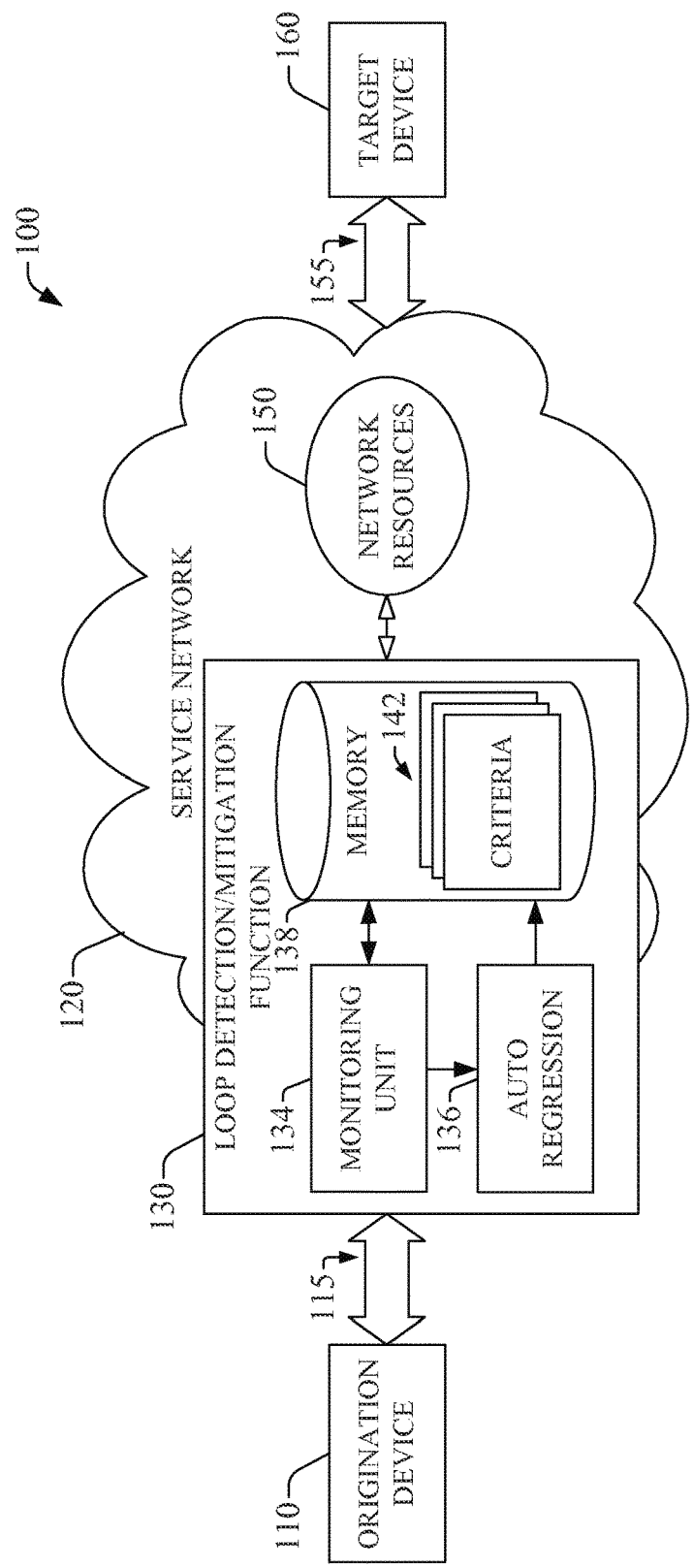
FIG. 1 is a diagram illustrating an example network environment in accordance with one or more aspects of the disclosure.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

As utilized in this specification and the annexed drawings, the terms "system," "component," "unit," "interface," "platform," "node," "function" and the like are intended to include a computer-related entity or an entity related to an operational apparatus with one or more specific functionalities, wherein the computer-related entity or the entity related to the operational apparatus can be either hardware, a combination of hardware and software, software, or software in execution. Such entities also are referred to as "functional elements." As an example, a unit can be, but is not limited to being, a process running on a processor, a processor, an object (metadata object, data object, signaling object), an executable computer program, a thread of execution, a program, a memory (e.g., a hard-disc drive), and/or a computer. As another example, a unit can be an apparatus with specific functionality provided by mechanical parts operated by electric or electronic circuitry which is operated by a software application or a firmware application executed by a processor, wherein the processor can be internal or external to the apparatus and can execute at least a portion of the software application or the firmware application. As yet another example, a unit can be an apparatus that provides specific functionality through electronic functional elements without mechanical parts, the electronic functional elements can include a processor therein to execute software or firmware that provides, at least in part, the functionality of the electronic functional elements. The foregoing examples and related illustrations are but a few examples and are not intended to be limiting. In addition, while such illustrations are presented for a unit, the foregoing examples also apply to a node, a function, a controller, a component, a system, a platform, and the like. It is noted that in certain embodiments, or in connection with certain aspects or features such embodiments, the terms "unit," "component," "system," "interface," "platform" "node," "function" can be utilized interchangeably.

Throughout the description and claims of this specification, the words "comprise" and "having" and their variations, such as "comprising" and "comprises," "having" and "has," mean "including but not limited to," and are not intended to exclude, for example, other units, nodes, components, functions, interfaces, actions, steps, or the like. "Exemplary" means "an example of" and is not intended to convey an indication of a preferred or ideal embodiment. "Such as" is not used in a restrictive sense, but for explanatory purposes.

Reference will now be made in detail to the various embodiments and related aspects of the subject disclosure, examples of which are illustrated in the accompanying drawings and their previous and following description. Wherever possible, the same reference numbers are used throughout the drawings to refer to the same or like parts.

The disclosure identifies and addresses, in one aspect, mitigation of processing loops during establishment of a communication session in a network. In an aspect, the communication session can be a multimedia over Internet Protocol session. In one aspect, a network node at the boundary of the network can mitigate processing loops by monitoring formation of such loops and proactively terminating processing of the communication session in response to expiration of a timer. The timer can be initiated in response to formation of a processing loop (also referred to as a routing loop).

An expiration period, or expiration threshold, for the timer can be configured based on one or more factors associated with the communication session. In one aspect, the expiration period can be configured according to a schedule or in response to a network event (e.g., addition of bandwidth). Configuration of the timer can be automatic or can be autonomous. The threshold can be an optimized value determined through machine learning over auto-regression of a multiple of the duration of successful call set up per logical grouping. For example, a threshold can be determined for a network covering a geographic region, such as the continental USA. Certain functional elements of the disclosure can be implemented (e.g., performed) by software, hardware, or a combination of software and hardware. Functional elements of the various embodiments described in the present specification and illustrated in the annexed drawings can be employed in operational environments (access network, telecommunication network, signaling network, etc.) that can include, for example, digital equipment, analog equipment, or both, and can be wired or wireless equipment. One or more embodiments of the subject disclosure can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

Referring to the drawings, FIG. 1 illustrates a high-level block diagram of an exemplary network environment 100 in accordance with one or more aspects of the disclosure. As illustrated, the exemplary network environment 100 can comprise an originating device 110 functionally coupled (e.g., communicatively coupled via wired links or wireless links, or a combination thereof) to a service network 120, which can include wireless networks, wireline networks, and any combination thereof. A data and signaling pipe 115 comprising an upstream link, or uplink (UL), and a downstream link, or downlink (DL), can enable functional coupling among the originating device 110 and the network 120. The data and signaling pipe 115 can comprise a wireless link or wireline link, or a combination thereof.

Device 110 can be embodied in or can comprise end-user equipment, such as a user device (mobile or otherwise) or most any customer premises equipment. Accordingly, originating device 110 can be an electronic device that is part of a network (e.g., a telecommunication network, a home network, a utilities network, or combinations thereof) and can have various levels of computational capability. For example, the device 110 can be at least one of a terminal display device, a set top box (STB), an internet protocol (IP)-enabled television, a personal computer, a portable computer, a wearable computer, and so forth. The originating device 110 can comprise an identifier (e.g., a metadata field, a hypermedia link, etc.) that identifies the device 110.

In addition, the example network environment 100 can also include a target device 160 functionally coupled to the service network 120, for example, via a data and signaling pipe 155, which can comprise a wireless link or wireline link, or a combination thereof. The target device 160 can comprise an identifier (e.g., a metadata field, a hypermedia link, etc.) that identifies the device 110.

In one aspect, the device 110 can transmit a session initiation request to query a network repository (e.g., a content distribution network (CDN)) for a fragment (or data object) associated with a media asset intended to be received and/or consumed at the device 110. To initiate and/or support a communication session, the originating device 110 and the target device 160 can exploit the network 120, to which the originating device 110 can communicate with in accordance with various packet-switched (PS) communication protocols supported by such network. Similarly, the target device 160 also can communicate with the network 120 in accordance with various PS communication protocols. For instance, the various packet-switched communication protocols can include one or more of an Ethernet protocol format; an internet protocol (IP) format, such as IPv4 and IPv6, or the like; a user datagram protocol (UDP) format; HTTP; a simple object access protocol (SOAP); or a simple network management protocol (SNMP).

It should be appreciated that in certain embodiments one or more of the originating device 110 or the target device 160 can communicate (e.g., exchange information) with the network 120 according to non-packet-switched communication protocols. For instance, the target device can be a plain old telephone systems (POTS) device, which can communicate with the service network 120 via a circuit-switched (CS) communication protocol.

The service network 120 can include wireless networks, wireline networks, and any combination thereof, which can permit establishment (e.g., initiation, maintenance, initiation and maintenance, etc.) of a communication session. In one aspect, the service network 120 can include one or more of wide area networks (WANs), one or more local area networks (LANs), signaling networks (e.g., SS#7, etc.), and so forth. Such networks can operate in accordance with most any communication protocol for wireline communication or wireless communication. In certain embodiments, network 120 can have several functional elements that can provide a backbone network, such as a high-capacity packet-switched network. In other embodiments, network 120 can have internal structure, with several functional elements that can provide at least two main operational blocks: a backbone network (e.g., a high-capacity packet-switched network) and a regional access network (RAN). The internal structure also can include functional elements that provide more spatially localized networks, such as local area networks, home area networks, or the like. Both the backbone network and the regional access network (RAN) can be WANs, for example, with the backbone network having a larger geographical scope than the RAN.

In one embodiment, the network 120 of FIG. 1 can comprise a core network platform functionally coupled to a distribution network. The network 120 can be configured for communications sessions. The communication sessions can be interactive. The core network platform can include various network nodes, which can be distinguished according to their functionality. As illustrated, the various network nodes can comprise one or more servers, and one or more nodes (e.g., gateway node(s)). The one or more servers can comprise, for example, adaptation layer units, application server(s), management server(s), proxy server(s), and the like. Functionality and architecture of the one or more servers and the one or more nodes generally is specific, yet not exclusive, to the embodiment of the core network platform. For instance, in an exemplary embodiment in which the core network platform embodies or comprises an IMS network, server(s) can comprise application server(s), and specific function control nodes (e.g., Call Session Control Functions (CSCFs), such as serving CSCF (S-CSCF) and interrogating CSCF (I-CSCF)) and proxy servers; and node(s) can comprise one or more gateway nodes having a breakout gateway control function (BGCF), a media gateway (MGW) and a signaling gateway (SGW), and media gateway control function (MGCF).

The core network platform can permit implementation of various network management operations (access authorization and accounting, provisioning, billing, etc.); content integrity monitoring; or network functionality comprising programming monitoring, advertisement monitoring, or both. In addition or in the alternative, the core network platform can include an application layer having at least one server of the one or more servers. The at least one server in the application layer can provide media content, such as media assets, which can be either linear-programming assets or non-linear assets (e.g., media-on-demand). In one aspect of web-based transmission of the media content, the at least one server can comprise a content server (not shown) that can encapsulate, or partition, the media content into fragments, or data objects. In one aspect, the content server (not shown) can format the fragments, or data objects, in accordance with any format (e.g., joint photographic experts group (JPEG) file interchange format (JFIF)) suitable for packet-switched transmission of media content. Encapsulation into fragments, also referred to as fragmentation, of a media asset can comprise compression of such asset. In one implementation, compression can be accomplished according to the JPEG compression method.

In the illustrated embodiment, the service network 120 also can comprise a transport network that can be a WAN that can be embodied in a wireless network, a wireline network, or a combination thereof, and supplies data service(s), such as television programming, video on demand, internet service, packet-switched telephony, to a user location, which can be stationary (e.g., a location of a dwelling (residential or enterprise)) or mobile (e.g., a location of a mobile device). The transport network can be embodied in an optic fiber network, a coaxial cable network, an HFC network, an optic fiber network, a coaxial network, a wireless network, and the like. In an embodiment in which the transport network is an HFC network, data pipe and signaling can comprise several optic fiber links and associated optical functional elements, such as downstream lasers, light amplifiers, last-mile fiber aggregator nodes, and the like. In addition, in such embodiment, the transport network can comprise various RF amplifiers and coaxial taps to respective dwellings (residential, multi-unit, enterprise, etc.) wherein the originating device 110 can consume a data service (e.g., internet service) provided through the various networks in the exemplary network environment 100. In one aspect, the originating device 110 can be functionally coupled to a cable modem or other device (e.g., a network interface device (NID)) that serves as the network gateway to the dwelling network from the transport network. As another illustration, in an embodiment in which the transport network is a wired broadband packet-switched network, data and signaling pipes can comprise Ethernet links, T-1 carriers, and/or fiber optic links, and can include network routers, such as BRASs, and network switching, such as DSLAMs. The network switches can be functionally coupled to home gateways (e.g., DSL modems) in a dwelling in which the originating device 110 can consume or can enable data services (e.g., internet service) provided through the various networks in the exemplary network environment 100.

In one aspect, the originating device 110 can transmit a session initiation message (e.g., a VoIP session initiation message) to a loop detection/mitigation function 130 (e.g., a session boundary control (SBC) function) in order to initiate a communication session with the target device 160. The session initiation message can convey information (e.g., data and/or metadata) that identifies the originating device 110 and/or the target device 160. The loop detection/mitigation function 130 can regulate allocation of network resources 150 that can be dedicated for such communication session. The network resources 150 can comprise one or more of bandwidth, communication channels (such as signaling channels), PDPs, processing resources, or the like. As illustrated, the loop detection/mitigation function 130 can comprise a monitoring unit 134 functionally coupled to a memory 138. The monitoring unit 134 can observe session initiation in progress and can determine whether the session initiation is a part of a loop or a non-loop request. A non-loop session can receive responses from a request within the time interval of timer threshold. If a session in progress does not receive responses to a request within the time interval of the timer threshold, the session can be considered either a looped session or an invalid session. Determining the timer threshold can comprise auto regression 136 of the session initiation request's response duration of successful communication sessions (e.g., calls) where a media session occurred and successfully ended, indicated by valid messages (e.g., SIP BYE). In an aspect, auto regression on successful response delay can be conducted per route groups. Route groups can be defined, for example, as groups of destinations with similar end-to-end propagation delay properties. The monitoring unit 134 can apply at least one session criterion in order to permit or reject processing of the communication session. The at least one criterion can be retained in one or more memory elements 142, labeled as criteria. In one aspect, the criteria can comprise a timer threshold value per destination route group. This value can be the product of the safety factor per route group and predicted (auto-regressed) future value of the response duration per route. The safety factor per route group can be a manually configurable parameter for the network provider to engineer a number of route advance. For example, a network provider willing to tolerate N route advance can configure the safety factor as N+1. In a scenario in which application of the at least one criterion indicates that the processing of the communication session can proceed, the loop detection/mitigation function 130 can broker establishment of the communication session.

Figure 2:
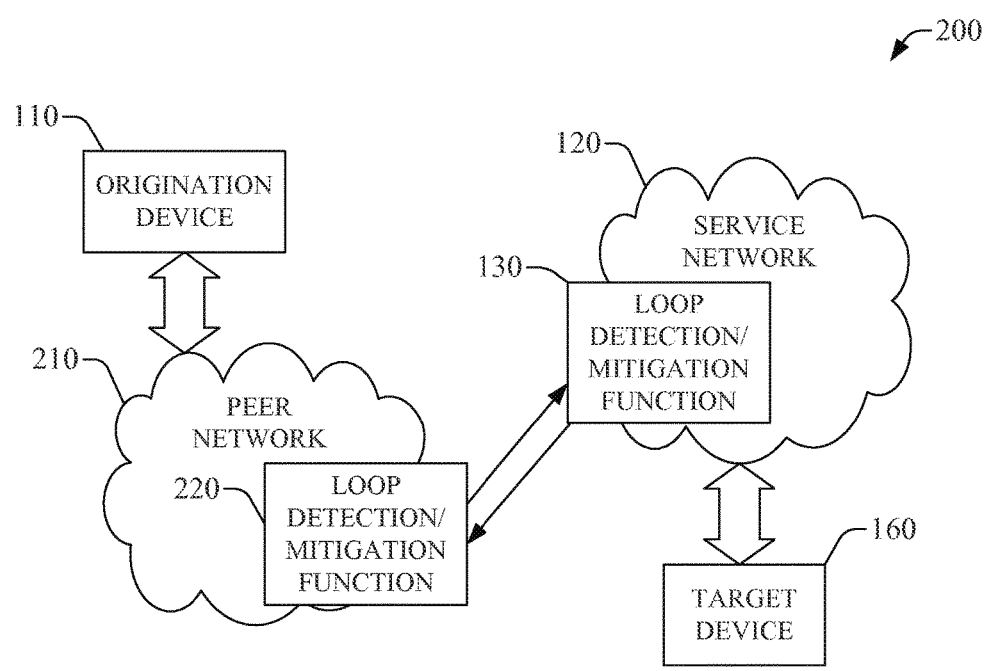
FIG. 2 is a diagram illustrating another example network environment in accordance with one or more aspects of the disclosure.

As illustrated in FIG. 2, a communication processing loop can be formed in response to processing a communication session to be established between a loop detection/mitigation function 130 in a service network 120 and a loop detection/mitigation function 220 in a peer network 210. Peer network 210 can be of similar functionality and setup to service network 120. In certain embodiments, the control function can perform the analysis leading to configuration of timer expiration thresholds.

Figure 3:
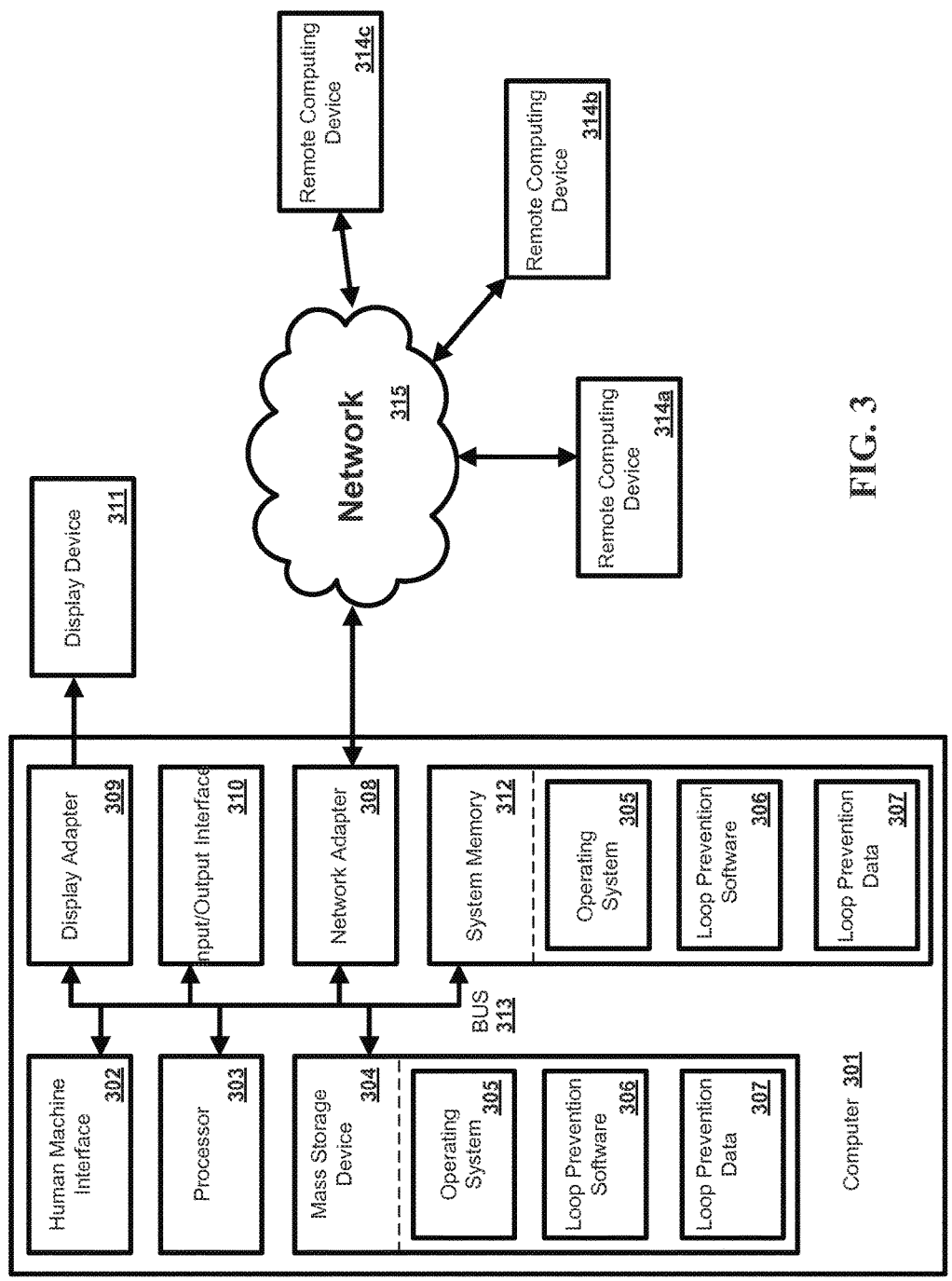
FIG. 3 is a diagram illustrating an example embodiment of a computing device in accordance with one or more aspects of the disclosure.

In an exemplary aspect, the methods and systems can be implemented on a computer 301 as illustrated in FIG. 3 and described below. Similarly, the methods and systems disclosed can utilize one or more computers to perform one or more functions in one or more locations. FIG. 3 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 301. The components of the computer 301 can comprise, but are not limited to, one or more processors or processing units 303, a system memory 312, and a system bus 313 that couples various system components including the processor 303 to the system memory 312. In the case of multiple processing units 303, the system can utilize parallel computing.

The system bus 313 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 313, and all buses specified in this description can also be implemented over a wired or wireless network connection and each of the subsystems, including the processor 303, a mass storage device 304, an operating system 305, loop prevention software 306, loop prevention data 307, a network adapter 308, system memory 312, an Input/Output Interface 310, a display adapter 309, a display device 311, and a human machine interface 302, can be contained within one or more remote computing devices 314a,b,c at physically separate locations, connected through buses of this form, in effect implementing a fully distributed system.

The computer 301 typically comprises a variety of computer readable media. Exemplary readable media can be any available media that is accessible by the computer 301 and comprises, for example and not meant to be limiting, both volatile and non-volatile media, removable and non-removable media. The system memory 312 comprises computer readable media in the form of volatile memory, such as random access memory (RAM), and/or non-volatile memory, such as read only memory (ROM). The system memory 312 typically contains data such as loop prevention data 307 and/or program modules such as operating system 305 and loop prevention software 306 that are immediately accessible to and/or are presently operated on by the processing unit 303.

In another aspect, the computer 301 can also comprise other removable/non-removable, volatile/non-volatile computer storage media. By way of example, FIG. 3 illustrates a mass storage device 304 which can provide non-volatile storage of computer code, computer readable instructions, data structures, program modules, and other data for the computer 301. For example and not meant to be limiting, a mass storage device 304 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 304, including by way of example, an operating system 305 and loop prevention software 306. Each of the operating system 305 and loop prevention software 306 (or some combination thereof) can comprise elements of the programming and the loop prevention software 306. Loop prevention data 307 can also be stored on the mass storage device 304. Loop prevention data 307 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 301 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 303 via a human machine interface 302 that is coupled to the system bus 313, but can be connected by other interface and bus structures, such as a parallel port, game port, an IEEE 1394 Port (also known as a Firewire port), a serial port, or a universal serial bus (USB).

In yet another aspect, a display device 311 can also be connected to the system bus 313 via an interface, such as a display adapter 309. It is contemplated that the computer 301 can have more than one display adapter 309 and the computer 301 can have more than one display device 311. For example, a display device can be a monitor, an LCD (Liquid Crystal Display), or a projector. In addition to the display device 311, other output peripheral devices can comprise components such as speakers (not shown) and a printer (not shown) which can be connected to the computer 301 via Input/Output Interface 310. Any step and/or result of the methods can be output in any form to an output device. Such output can be any form of visual representation, including, but not limited to, textual, graphical, animation, audio, tactile, and the like. The display 311 and computer 301 can be part of one device, or separate devices.

The computer 301 can operate in a networked environment using logical connections to one or more remote computing devices 314*a,b,c*. By way of example, a remote computing device can be a personal computer, portable computer, smartphone, a server, a router, a network computer, a peer device or other common network node, and so on. Logical connections between the computer 301 and a remote computing device 314*a,b,c* can be made via a network 315, such as a local area network (LAN) and/or a general wide area network (WAN). Such network connections can be through a network adapter 308. A network adapter 308 can be implemented in both wired and wireless environments. Such networking environments are conventional and commonplace in dwellings, offices, enterprise-wide computer networks, intranets, and the Internet.

For purposes of illustration, application programs and other executable program components such as the operating system 305 are illustrated herein as discrete blocks, although it is recognized that such programs and components reside at various times in different storage components of the computing device 301, and are executed by the data processor(s) of the computer. An implementation of loop prevention software 306 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Figure 4:
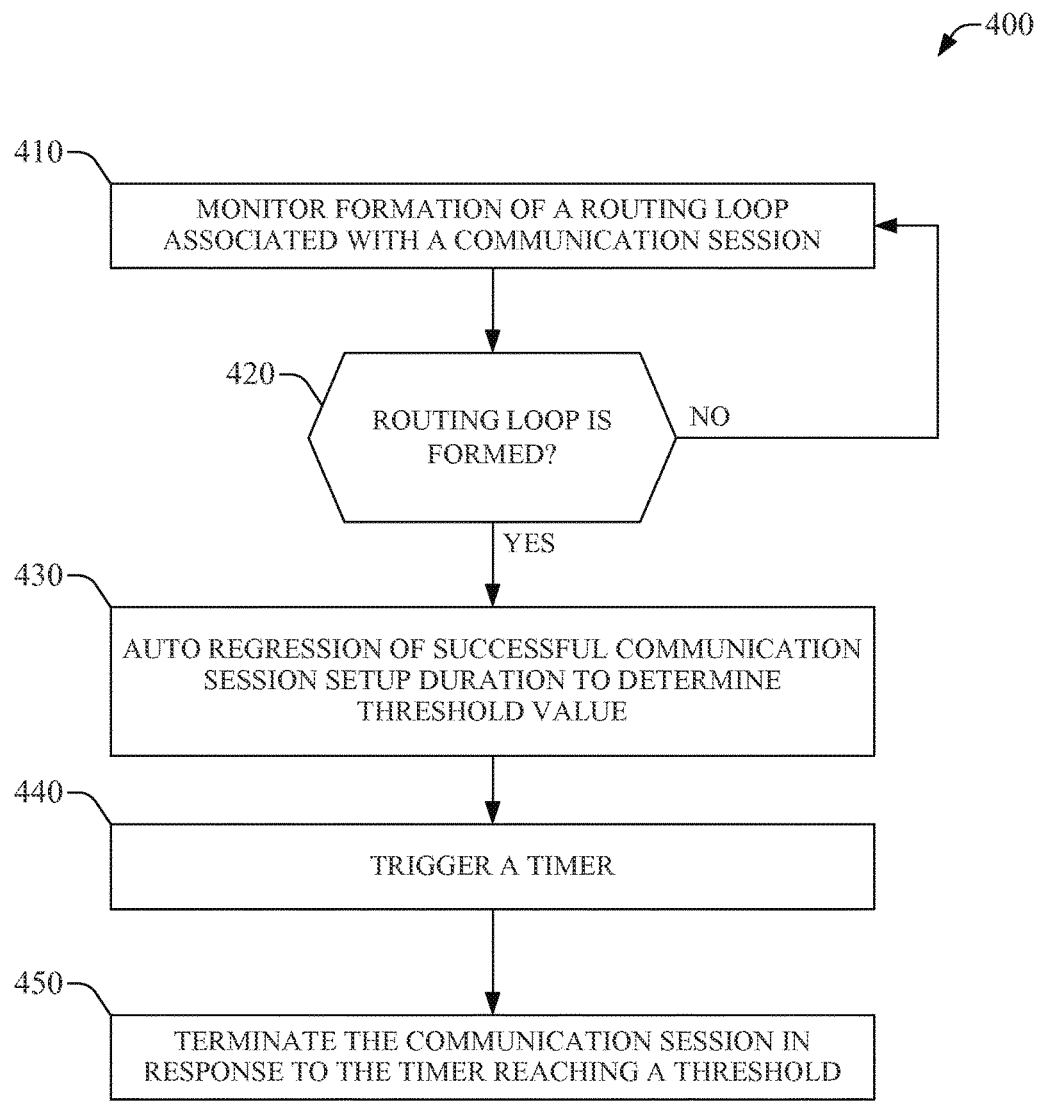
FIG. 4 is a flow chart illustrating an example method in accordance with one or more aspects of the disclosure.

FIG. 4 is a flowchart of example method 400 for processing a communication session (e.g., an interactive multimedia session, a voice over IP call, etc.) according to one or more aspects of the disclosure. One or more block of the example method 400 can be implemented (e.g., performed or executed) by a computing device and/or software, such as the loop detection/mitigation function 130, or a processor integrated into the computing device or functionally coupled thereto. The method set forth in the blocks of FIG. 4 is in not intended to be performed in a specific order.

At block 410, formation of a routing loop associated with a communication session can be monitored. In one aspect, monitoring formation of the routing loop can comprise monitoring presence or exchange of error codes between a first network (e.g., service network 120) and a second network (e.g., peer network 210). At block 420, it can be determined whether a routing loop has been formed. A determination can be accomplished based at least on information obtained during the monitoring action at block 410. For example, if a communication session in progress does not receive responses for request within a predetermined time interval, the session can be considered either a looped session or an invalid session. At block 430, a threshold can be determined. For example, auto regression of a successful communication session setup duration can be performed to determine a threshold value of a time interval (timer setting). Determining the timer setting can comprise auto regression of a session initiation request's response duration of successful communication sessions (e.g., calls) where a media session occurred and successfully ended, indicated by valid messages (e.g., SIP BYE). In a further aspect, the value of the timer setting can be the product of the safety factor per route group and predicted (auto-regressed) future value of the response duration per route. The safety factor per route group can be a manually configurable parameter for the network provider to engineer a number for route advance. Route advance can refer to the routing within a telecom switching system to an alternate route trunk group (or trunk subgroup) when all trunks in a prior trunk group (or trunk subgroup) are busy. In an aspect, auto regression on successful response delay can be conducted per route groups.

Route groups can be defined, for example, as groups of destinations with similar end-to-end propagation delay properties. In one aspect, a timer setting value per destination route group can be implemented. A timer can be triggered at block 440. Triggering the timer can comprise one or more of starting the timer, reaching a threshold during the timer, and/or the timer expiring. At block 450, the communication session can be terminated in response to the timer starting, reaching a threshold, and/or expiring.

Figure 5:
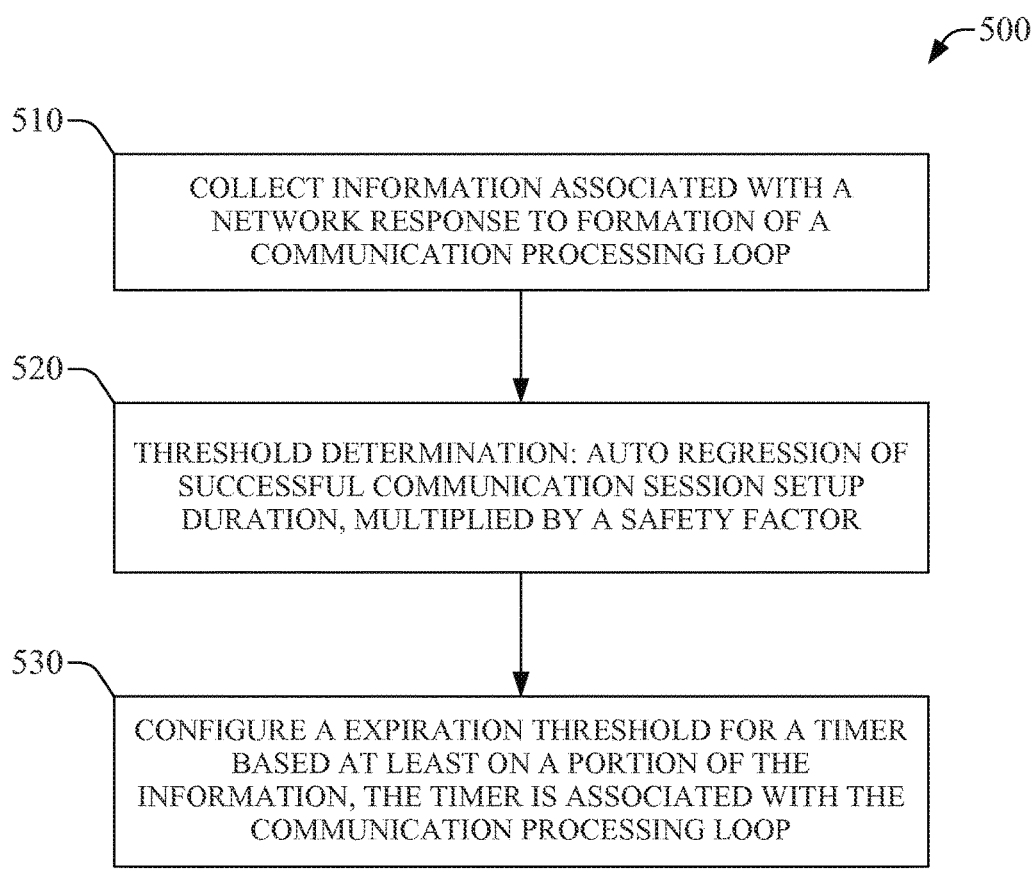
FIG. 5 is a flow chart illustrating example method in accordance with one or more aspects of the disclosure.

FIG. 5 is a flowchart of an example method 500 for loop prevention according to one or more aspects of the disclosure. One or more blocks of the example method 500 can be implemented (e.g., performed or executed) by the computing device that can perform the example method 400. In addition or in the alternative, a processor of the computing device or functionally coupled thereto can implement (e.g., perform or execute) one or more blocks of the exemplary method 500. The method set forth in the blocks of FIG. 5 is in not intended to be performed in a specific order.

At block 510, information can be collected that is associated with a network response to the formation of a communication processing loop. At block 520, a threshold determination can be made. For example, auto regression of a successful communication session setup duration can be performed as described in block 430 of FIG. 4. Additionally, the result of auto regression can be multiplied by a safety factor as described herein. At block 530, an expiration threshold for a timer can be configured based at least on a portion of the collected information and the result of block 520. In an aspect, the timer can be associated with the communication processing loop.

Figure 6:
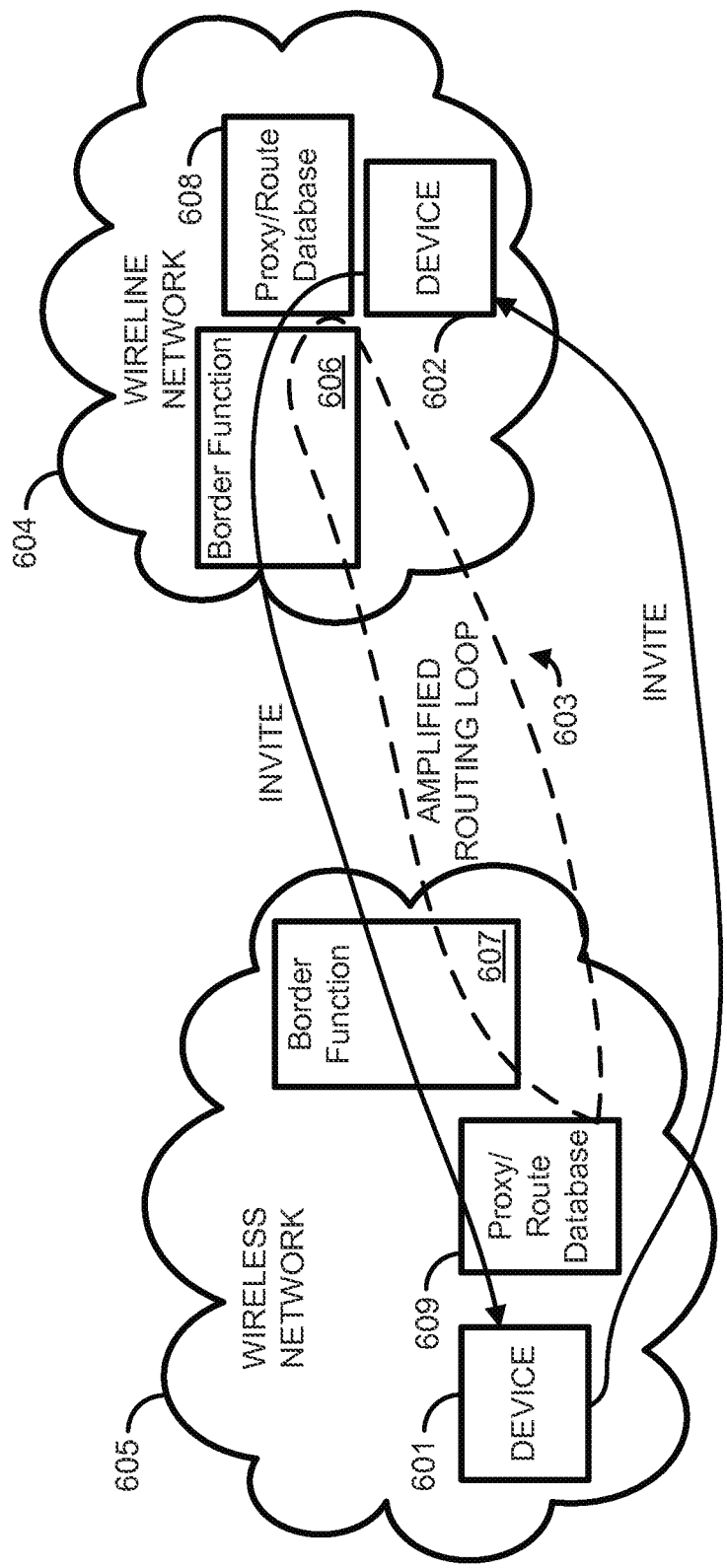
FIG. 6 is a diagram illustrating example embodiment in accordance with one or more aspects of the disclosure.

In an aspect, illustrated in FIG. 6, the present disclosure can address a call forwarding loop. A call forwarding loop can occur due to one or more reasons. For example, a user can enable call forwarding either in a cell phone 601 or a home phone 602. In some instances, routing through different networks, such as by way of Proxy/Route Databases 608 and/or 609, cannot resolve a route and can create loops. Another example can be a calling client (e.g., cell phone 601) (Alpha) enables call-forward call to a destination client (e.g., land phone 602) (Bravo). At the same time, the destination client Bravo enables call-forward to Alpha. This results in infinite call loop 603 (e.g., infinite loop). In an aspect, the timer can be configured through machine learning by auto regression of the successful call setup duration per logical grouping and multiplying the regressed value by a safety factor.

FIG. 6 illustrates a call loop 603 formed between two networks, such as a wireline network 604 and a wireless network 605. In an aspect, a user can have a cellular phone 601 for accessing the wireless network 605 and a land phone 602 for accessing the wireline network 604. By way of example, it is possible for a user (i) to configure call forward from the user's wireless phone 601 to the user's wireline phone 602 and (ii) to configure call forward from the user's wireline phone 602 to the user's wireless phone 601. Because these two phones forward calls to each other, a single call from outside creates a call loop 603 between the wireless network 605 and wireline network 604. By implementing the method and systems disclosed herein in any switch, Interconnection Border Control Function (IBCF), and/or Call Management Server (CMS)/Call Session Control Function (CSCF), for example, border functions 606 and 607, the call loop 603 can be mitigated because any switch, IBCF, CMS/CSCF, such as border functions 606 and 607, can detect the loop and disconnect the call.

Figure 7:
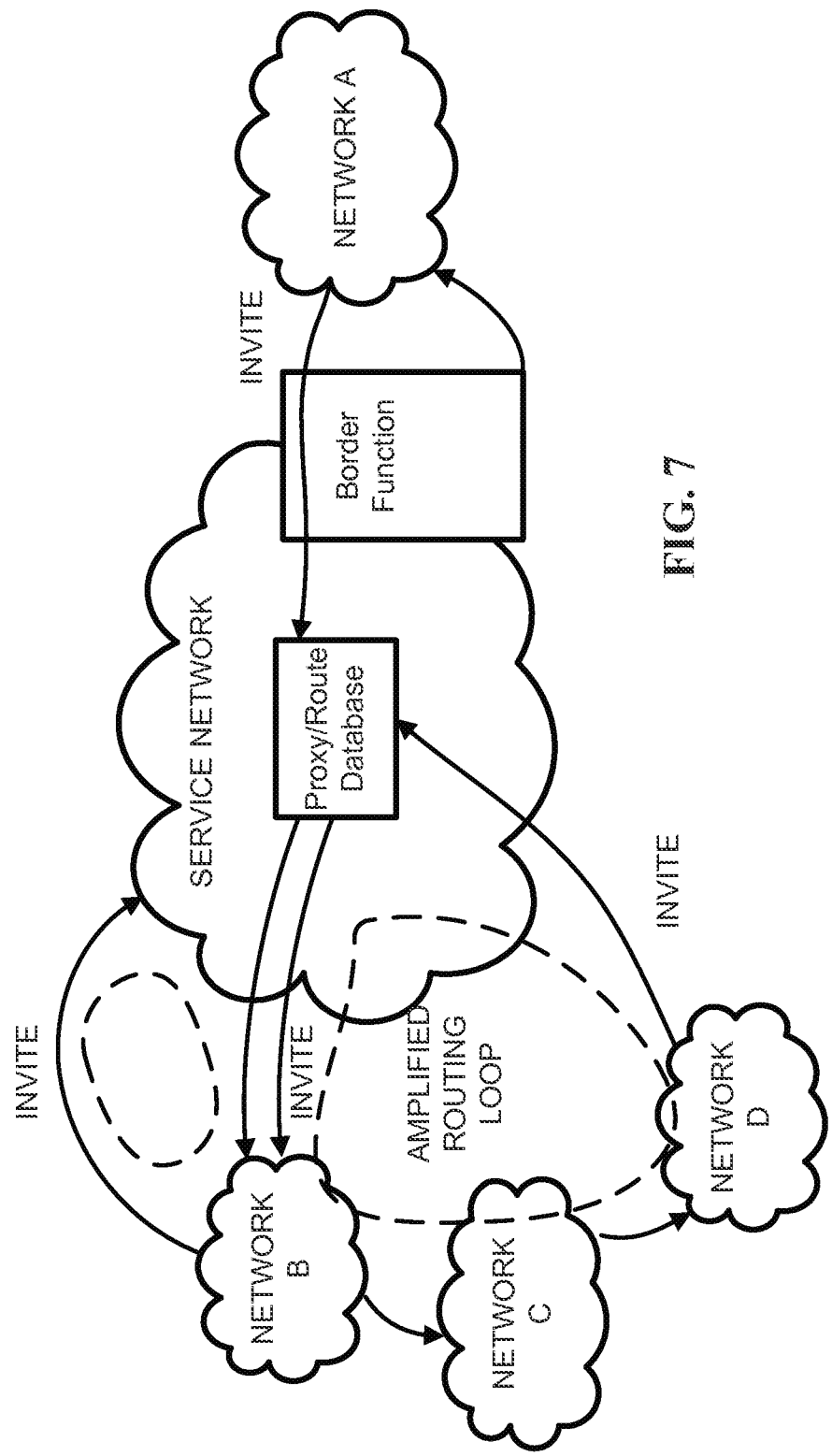
FIG. 7 is a diagram illustrating example embodiment in accordance with one or more aspects of the disclosure.

As shown in FIG. 7, in the absence of a loop prevention function, a call request (INVITE) can arrive from network A to the service network by way of a border function. The service network can utilize a proxy and route database to route the call to network B, network B can route the call to network C, network C can route the call to network D, and network D can route the call back to the service network. These networks remove call identity specific information in order to maintain the privacy of these networks. Thus, when the call comes back to a network, the network is not aware that these call previously traversed through it. Since each of these networks maintains its unique routing algorithm, the service network then routes the call back to network B, in turn network B routes to network C, network C routes to network D, and network D routes back to the service network.

Figure 8:
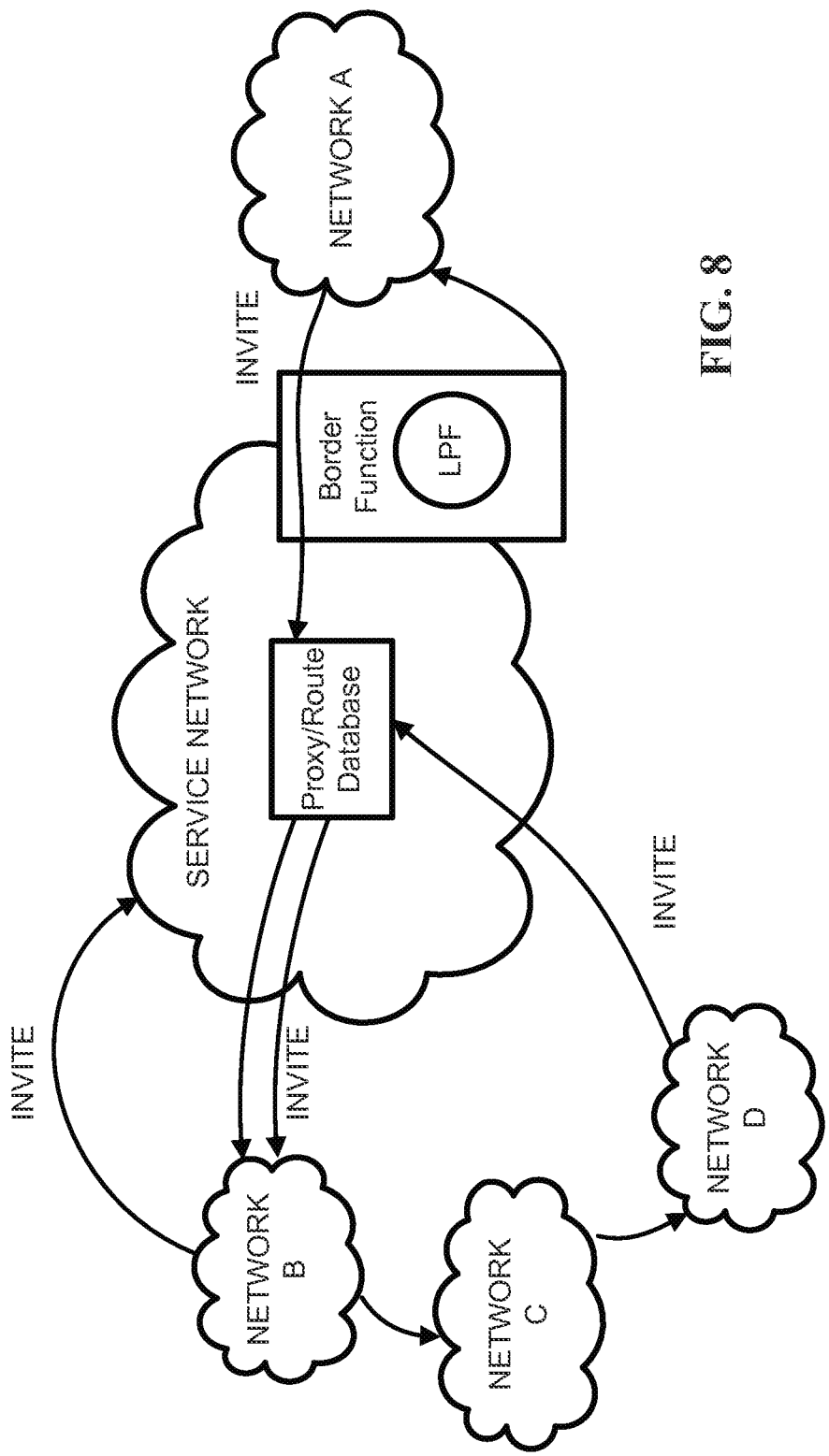
FIG. 8 is a diagram illustrating example embodiment in accordance with one or more aspects of the disclosure.

As shown in FIG. 8, the service network of FIG. 7 can be configured to implement the methods and systems disclosed herein for loop prevention by implementing a Loop Prevention Function (LPF) at a border function, for example. When a Loop Prevention Function as presently described herein is implemented, a call request (INVITE) arrives from network A to the service network. The Loop Prevention Function in the service network can detect that a loop has occurred in the downstream network and can cancel the call setup, avoiding loop creation.

In an aspect, a group of networks in a route association can support the domain sequence header in the SIP header, an authoritative registry assigns a number as a SIP domain. For example, the authority assigns a first system a number 77777, a second system a number 55555, and a third system 33333. This number will be stacked in the proposed SIP domain sequence.

By way of example, a SIP call originating from the first system (77777) and traversing through the second system (55555), the third system (33333), and loops back to the first system will contain SIP domain sequence {33333, 55555, 77777}. The first system will find the 77777 in the SIP domain sequence; thus, will understand a loop is detected.

For example, in the above use case, an example use case of a header "Domain-Sequence" will be such as follows:
Domain-Sequence:<sip: 33333>;index=1;
Domain-Sequence:<sip: 55555>;index=1.1;
Domain-Sequence:<sip: 77777>;index=1.2.

Figure 9:
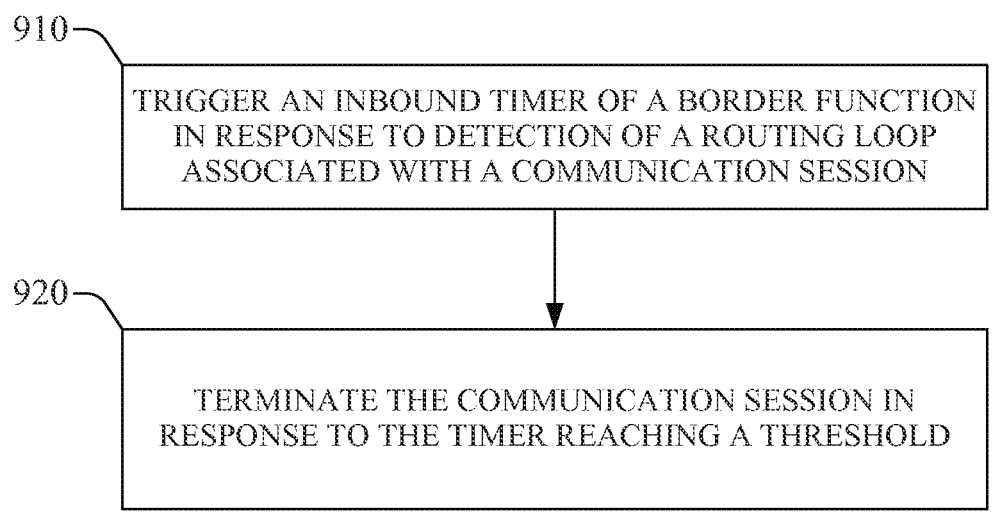
FIG. 9 is a flow chart illustrating an example method in accordance with one or more aspects of the disclosure.

In an aspect, illustrated in FIG. 9, provided are methods and systems comprising triggering, by a computing device, an inbound timer of a border function in response to detection of a routing loop associated with a communication session at 910 and terminating, by the computing device, the communication session in response to the timer reaching a threshold a 920. A border function can be the boundary between one administrative domain and another. A border function can be the boundary function of network that logically interfaces with the boundary function of another network. A domain can be a network or a subnetwork managed or administered by its own set of traffic engineering rules. An example a domain can be a provider network. Terminating can comprise terminating an incoming multimedia call session to an inside domain. For example, the inside domain can be the administrative domain controlled by the provider operating service network 120. An inside domain can be the domain or the network that implements the methods described herein. It should be noted that he method set forth in the FIG. 9 is in not intended to be performed in a specific order.

Figure 10:
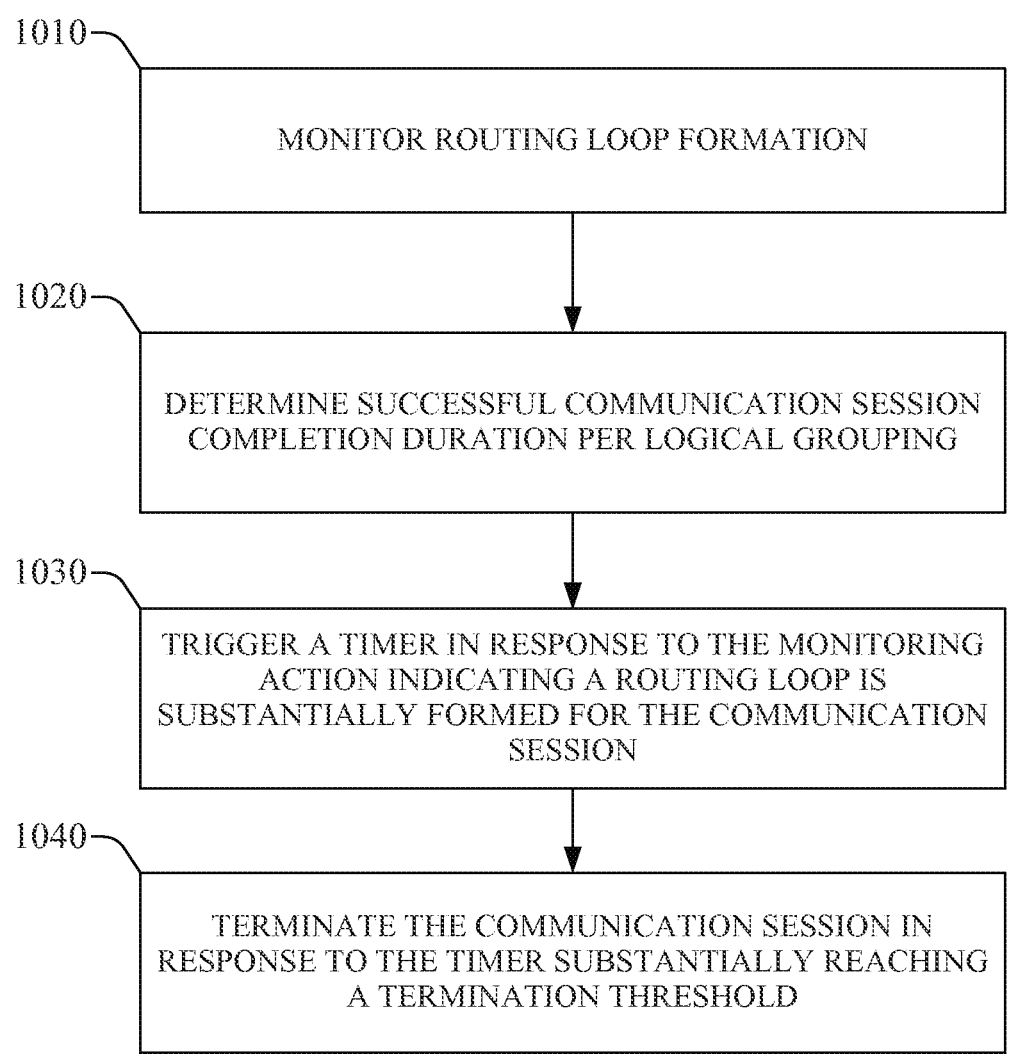
FIG. 10 is a flow chart illustrating another example method in accordance with one or more aspects of the disclosure.

In an aspect, illustrated in FIG. 10, provided are methods, comprising monitoring routing loop formation at 1010, determining successful communication session completion duration per logical grouping at 1020, triggering a timer in response to the monitoring action indicating a routing loop is formed for the communication session at 1030, and terminating the communication session in response to the timer reaching a termination threshold at 1040. The termination threshold can be configured based at least on class of the communication session and/or based at least on one or more of an event or a schedule. In an aspect, the methods can further comprise configuring the termination threshold autonomously.

The methods can further comprise configuring the threshold based at least on class of the communication session, wherein the class comprises data indicative of geographical proximity. The methods can further comprise configuring the threshold based at least on one or more of an event or a schedule. An example of event can be time delay in milliseconds to receive a response. An example of a schedule can be a specific time in coordinated universal time (UTC).

The methods can further comprise configuring the threshold autonomously (automatically). The methods can further comprise monitoring, by the computing device, to determine successful communication session completion duration per logical grouping. Monitoring can comprise monitoring a routing loop between a first provider and a second provider. It should be noted that the method set forth in the FIG. 10 is in not intended to be performed in a specific order.

The communication session can be a multimedia over Internet Protocol session.

The threshold can be an optimized value determined through machine learning over auto-regression of a multiple of the duration of successful call set up per logical grouping. For example, the threshold can be determined for a network covering a geographic region, such as the continental USA. The threshold can be an optimized value determined through machine learning over auto-regression of a multiple of the duration of successful call set up per logical grouping for a network covering a geographic region, such as the continental USA.

While the systems, apparatuses, and methods have been described in connection with exemplary embodiments and specific examples, it is not intended that the scope be limited to the particular embodiments set forth, as the embodiments herein are intended in all respects to be illustrative rather than restrictive.

Unless otherwise expressly stated, it is in no way intended that any protocol, procedure, process, or method set forth herein be construed as requiring that its acts or steps be performed in a specific order. Accordingly, in the subject specification, where a description of a protocol, procedure, process, or method does not actually recite an order to be followed by its acts or steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

It will be apparent that various modifications and variations can be made without departing from the scope or spirit of the subject disclosure. Other embodiments will be apparent from consideration of the specification and practice disclosed herein. It is intended that the specification and examples be considered as non-limiting illustrations only, with a true scope and spirit of the subject disclosure being indicated by the following claims.

What is claimed is:

1. A method, comprising:
   determining, by a computing device, based on an exchange of one or more error codes between a first network device associated with a first service provider and a second network device associated with a second service provider, that a routing loop associated with a communication session exists;
   triggering, based on determining that the routing loop exists, a timer, wherein a duration of the timer is based on multiplying a regressed value by a safety factor, wherein the regressed value is determined by auto regression of an amount of time associated with establishing a previous communication session between the first network device and the second network device, wherein the previous session occurred and successfully ended, indicated by valid messages; and
   terminating, based on the timer satisfying a threshold, the communication session.

2. The method of claim 1, wherein terminating the communication session comprises terminating an incoming multimedia call session to an inside domain.

3. The method of claim 1, further comprising configuring, based at least on a class of the communication session, the threshold, wherein the class comprises data indicative of geographical proximity.

4. The method of claim 1, further comprising configuring, based on one or more of an event or a schedule, the threshold.

5. The method of claim 1, further comprising configuring the threshold autonomously.

6. The method of claim 1, further comprising determining a successful communication session completion duration for a portion of a network.

7. The method of claim 6 further, comprising terminating, based on another routing loop and an expiration of another timer, another communication session, wherein the another routing loop is associated with the portion of the network and the another timer is based on the successful communication session completion duration.

8. An apparatus, comprising:
   one or more processors; and a memory storing processor executable instructions that, when executed by the one or more processors, cause the apparatus to:
   determine, based on an exchange of one or more error codes between a first network device associated with a first service provider and a second network device associated with a second service provider, a presence of a routing loop formed during a communication session;
   trigger, based on the presence of the routing loop, a timer, wherein a duration of the timer is based on multiplying a regressed value by a safety factor, wherein the regressed value is determined by auto regression of an amount of time associated with establishing a previous communication session between the first network device and the second network device, wherein the previous session occurred and successfully ended, indicated by valid messages; and
   terminate, based on the timer satisfying a termination threshold, the communication session.

9. The apparatus of claim 8, wherein the routing loop is between the first service provider and a second service provider.

10. The apparatus of claim 8, wherein the communication session comprises an incoming multimedia over Internet Protocol session.

11. The apparatus of claim 8, wherein the processor executable instructions, when executed by the one or more processors, further cause the apparatus to configure, based at least on a class of the communication session, the termination threshold.

12. The apparatus of claim 8, wherein the processor executable instructions, when executed by the one or more processors, further cause the apparatus to configure, based on one or more of an event or a schedule, the termination threshold.

13. The apparatus of claim 8, wherein the processor executable instructions, when executed by the one or more processors, further cause the apparatus to configure the termination threshold autonomously.

14. The apparatus of claim 8, wherein the termination threshold comprises an optimized value determined through machine learning over auto-regression of a multiple of the duration of successful call set up for each portion of a plurality of portions of a network.

15. The apparatus of claim 8, wherein the apparatus comprises an Internet Protocol border function.

16. One or more non-transitory computer readable media storing processor executable instructions that, when executed by at least one processor, cause the at least one processor to:
   determine, based on an exchange of one or more error codes between a first network device associated with a first service provider and a second network device associated with a second service provider, a presence of a routing loop formed during a communication session;
   trigger, based on the presence of the routing loop, a timer, wherein a duration of the timer is based on multiplying a regressed value by a safety factor, wherein the regressed value is determined by auto regression of an amount of time associated with establishing a previous communication session between the first network device and the second network device, wherein the previous session occurred and successfully ended, indicated by valid messages; and
   terminate, based on the timer satisfying a termination threshold, the communication session.

17. The one or more non-transitory computer readable media of claim 16, wherein the processor executable instructions, when executed by the at least one processor, further cause the at least one processor to configure, based at least on a class of the communication session, the termination threshold.

18. The one or more non-transitory computer readable media of claim 16, wherein the processor executable instructions, when executed by the at least one processor, further cause the at least one processor to configure, based on one or more of an event or a schedule, the termination threshold.

19. The one or more non-transitory computer readable media of claim 16, wherein the processor executable instructions, when executed by the at least one processor, further cause the at least one processor to configure the termination threshold autonomously.

20. The one or more non-transitory computer readable media of claim 16, wherein the termination threshold comprises an optimized value determined through machine learning over auto-regression of a multiple of the duration of successful call set up for each portion of a plurality of portions of a network.

* * * * *